(12) United States Patent
Dey et al.

(10) Patent No.: US 12,538,021 B2
(45) Date of Patent: Jan. 27, 2026

(54) HIGH SPEED AUTOFOCUS FOR IMAGES

(71) Applicant: QUALCOMM Incorporated, San Diego, CA (US)

(72) Inventors: Abhijeet Dey, Bengaluru (IN); Varun Bansal, New Delhi (IN); Shridhar Prakash Patil, Chikkodi (IN); Joby Abraham, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 18/741,644

(22) Filed: Jun. 12, 2024

(65) Prior Publication Data

US 2025/0386096 A1    Dec. 18, 2025

(51) Int. Cl.
*H04N 23/67*    (2023.01)
(52) U.S. Cl.
CPC .................................. *H04N 23/67* (2023.01)
(58) Field of Classification Search
CPC ...................................................... H04N 23/67
See application file for complete search history.

(56) References Cited

U.S. PATENT DOCUMENTS

| | | | |
|---|---|---|---|
| 11,202,007 B1* | 12/2021 | Dhanda | H04N 23/67 |
| 11,627,244 B1* | 4/2023 | Dhanda | H04N 23/57 |
| | | | 348/349 |
| 2016/0112612 A1* | 4/2016 | Kakkori | G03B 13/36 |
| | | | 348/373 |
| 2016/0301846 A1* | 10/2016 | Mobbs | H04N 23/951 |
| 2022/0114712 A1* | 4/2022 | Wu | G06T 5/50 |

* cited by examiner

*Primary Examiner* — Shahbaz Nazrul
(74) *Attorney, Agent, or Firm* — QUALCOMM Incorporated

(57) ABSTRACT

Disclosed are systems and techniques for image processing. For example, a computing device can obtain, from an image sensor, a primary image frame of a scene. The computing device can obtain, from the image sensor during an idle time (e.g., a vertical blanking interval (VBI)) of the image sensor, auxiliary image frames of the scene. Each of the auxiliary image frames corresponds to a region of interest in the scene and includes a lower resolution than the primary image frame. The computing device can process the primary image frame and the auxiliary image frames to focus the image sensor based on the region of interest.

20 Claims, 9 Drawing Sheets

HIGH SPEED AUTOFOCUS FOR IMAGES

FIELD

The present disclosure generally relates to image processing. For example, aspects of the present disclosure relate to high speed autofocus for images.

BACKGROUND

The increasing versatility of digital camera products has allowed digital cameras to be integrated into a wide array of devices and has expanded their use to different applications. For example, phones, drones, cars, computers, televisions, and many other devices today are often equipped with camera devices. The camera devices allow users to capture images and/or video (e.g., including frames of images) from any system equipped with a camera device. The images and/or videos can be captured for recreational use, professional photography, surveillance, and automation, among other applications. Moreover, camera devices are increasingly equipped with specific functionalities for modifying images or creating artistic effects on the images. For example, many camera devices are equipped with image processing capabilities for generating different effects on captured images.

For image processing, automatic focusing (autofocus) can be used to focus an image. Existing solutions for autofocus include phase detection autofocus (PDAF) and contrast detection autofocus (CDAF). PDAF detects where light rays meet when entering the image sensor, ensuring that that objects are in focus. CDAF measures the intensity difference (contrast) between adjacent pixels of the image sensor and adjusts for the maximal contrast to correct the image focus.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described herein for high speed autofocus for images.

According to at least one example, an apparatus for image processing is provided. The apparatus includes at least one memory and at least one processor coupled to the at least one memory and configured to: obtain, from an image sensor, a primary image frame of a scene; obtain, from the image sensor during an idle time of the image sensor, a plurality of auxiliary image frames of the scene, wherein each auxiliary image frame of the plurality of auxiliary image frames corresponds to a region of interest in the scene and includes a lower resolution than the primary image frame; and process the primary image frame and the plurality of auxiliary image frames to focus the image sensor based on the region of interest.

In some aspects, a method of image processing is provided. The method includes: obtaining, by an image sensor, a primary image frame of a scene; obtaining, by the image sensor during an idle time of the image sensor, a plurality of auxiliary image frames of the scene, wherein each auxiliary image frame of the plurality of auxiliary image frames corresponds to a region of interest in the scene and includes a lower resolution than the primary image frame; and processing, by a processor, the primary image frame and the plurality of auxiliary image frames to focus the image sensor based on the region of interest.

In some aspects, a non-transitory computer-readable medium is provided having stored thereon instructions that, when executed by at least one processor, cause the at least one processor to: obtain, from an image sensor, a primary image frame of a scene; obtain, from the image sensor during an idle time of the image sensor, a plurality of auxiliary image frames of the scene, wherein each auxiliary image frame of the plurality of auxiliary image frames corresponds to a region of interest in the scene and includes a lower resolution than the primary image frame; and process the primary image frame and the plurality of auxiliary image frames to focus the image sensor based on the region of interest.

In some aspects, an apparatus for image processing is provided. The apparatus includes: means for obtaining a primary image frame of a scene; means for obtaining, during an idle time of the image sensor, a plurality of auxiliary image frames of the scene, wherein each auxiliary image frame of the plurality of auxiliary image frames corresponds to a region of interest in the scene and includes a lower resolution than the primary image frame; and means for processing the primary image frame and the plurality of auxiliary image frames to focus the image sensor based on the region of interest.

In some aspects, each of the apparatuses described above is, can be part of, or can include a mobile device, a smart or connected device, a camera system, and/or an extended reality (XR) device (e.g., a virtual reality (VR) device, an augmented reality (AR) device, or a mixed reality (MR) device). In some examples, the apparatuses can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The preceding, together with other features and embodiments, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1:
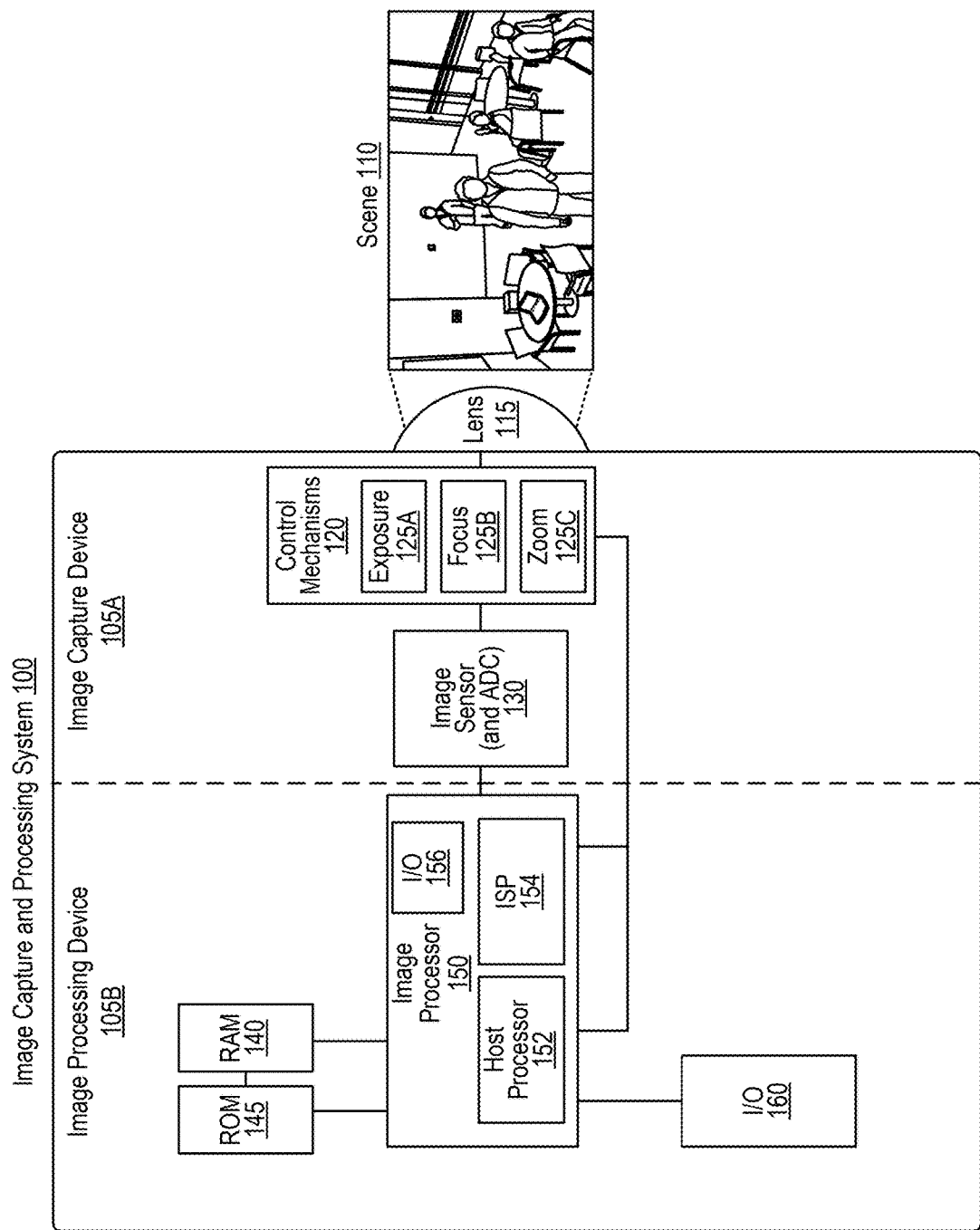
FIG. 1 is a block diagram illustrating an example architecture of an image capture and processing system, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

A camera is a device that receives light and captures image frames, such as still images or video frames, using an image sensor. The terms "image," "image frame," and "frame" are used interchangeably herein. Cameras may include processors, such as image signal processors (ISPs), that can receive one or more image frames and process the one or more image frames. For example, a raw image frame captured by an image sensor (e.g., a camera sensor) can be processed by an ISP to generate a final image. Processing by the ISP can be performed by a plurality of filters or processing blocks being applied to the captured image frame, such as denoising or noise filtering, edge enhancement, color balancing, contrast, intensity adjustment (such as darkening or lightening), tone adjustment, among others. Image processing blocks, engines, or modules may include lens/sensor noise correction, Bayer filters, de-mosaicing, color conversion, correction or enhancement/suppression of image attributes, denoising filters, sharpening filters, among others.

Cameras can be configured with a variety of image capture and image processing operations and settings. The different settings result in images with different appearances. Some camera operations are determined and applied before or during capture of the image, such as automatic focusing (AF), automatic exposure control (AEC), and automatic white balance (AWB) processing. Additional camera operations applied before, during, or after capture of an image include operations involving zoom (e.g., zooming in or out), ISO, aperture size, f/stop, shutter speed, and gain. Other camera operations can configure post-processing of an image, such as alterations to contrast, brightness, saturation, sharpness, levels, curves, or colors.

As previously mentioned, for image processing, automatic focusing (autofocus) can be used to focus an image. Existing solutions for autofocus include phase detection autofocus (PDAF) and contrast detection autofocus (CDAF). PDAF detects where light rays meet when entering the image sensor, ensuring that that objects are in focus. CDAF measures the intensity difference (contrast) between adjacent pixels of the image sensor and adjusts for the maximal contrast to correct the image focus. CDAF requires a plurality of image frames to find contrast peaks for the automatic focusing.

PDAF has the advantage of providing for a faster automatic focusing than CDAF (e.g., or laser assisted autofocus techniques). However, PDAF requires the use of costly complex phase detection (PD) sensors, which have PD pixels that provide additional phase detection information. To process this additional phase detection information, additional hardware in the image signal processor (ISP) is needed. This additional hardware increases the ISP system on a chip (SOC) area footprint. For these two reasons (e.g., requirement of costly complex sensors and additional hardware in ISP), PDAF is predominately implemented in premium tier products, where the quality of autofocus and the speed of autofocus are critical to provide for a premium user experience.

In contrast to PDAF, CDAF is a low cost autofocus solution that employs typical image sensors, which do not provide additional data. As such, CDAF does not require additional hardware in the ISP for processing and, as such, the ISP SOC area needed for CDAF is smaller than that of for PDAF. However, CDAF has the disadvantage of achieving focus at a slower rate as compared to PDAF and, thus, CDAF provides a lower quality user experience than PDAF. As such, CDAF is typically employed in value tier and lower tier products due to its low cost. A solution that can provide for a fast automatic focusing (e.g., similar to PDAF) is desirable. For instance, fast automatic focusing at a low cost can be beneficial for value tier and low tier products.

According to some aspects, systems, apparatuses, processes (also referred to as methods), and computer-readable media (collectively referred to herein as "systems and techniques") are described herein for providing high speed autofocus for images, such as contrast-based high speed autofocus. In some aspects, the systems and techniques provide (e.g., for CDAF) a new sensor mode for an image sensor to send multiple, low resolution image frames (referred to as auxiliary image frames) corresponding to a region of interest during an idle time of the image sensor to achieve a fast autofocus. In some cases, the region of interest can correspond to a particular object (e.g., a face) in a scene. In some examples, the region of interest can be selected based on user input (e.g., a user selection via a touchscreen user interface, a gesture input, a gaze input, etc.), based on object detection, and/or based on other input or process. The multiple, low resolution auxiliary image frames can be processed (e.g., for CDAF) at a much higher speed than primary image frames (e.g., full image frames) and can be output between successive primary image frames for preview. In some aspects, the solution using auxiliary image frames can be implemented for CDAF, PDAF, and/or other autofocus techniques to improve the CDAF, PDAF, etc. performance (e.g., improvement to PDAF from requiring two to three primary image frames for autofocusing to only needing one primary image frame for autofocusing).

In some examples, the solution provides knobs (e.g., choices, such as a region of interest, scale ratio, and/or bits per pixel for the auxiliary image frames) to original equipment manufacturers (OEMs) that can be used (e.g., adjusted) for a trade-off between the autofocus speed (e.g., quality of the user experience) and the required power. For example, there can be scenarios where the power requirement is not critical and, as such, additional power may be consumed and a faster autofocus can be achieved. Conversely, there can be scenarios where the power criteria is critical and a slower autofocus is acceptable.

In one or more aspects, during operation of the systems and techniques for image processing, an image sensor (e.g., of a camera device) can obtain a primary image frame of a scene. The image sensor, during an idle time of the image sensor, can obtain a plurality of auxiliary image frames of the scene. In one or more examples, each auxiliary image frame of the plurality of auxiliary image frames can correspond to a region of interest in the scene and can include a lower resolution than the primary image frame. A processor (e.g., an autofocus processor) can process the primary image frame and the plurality of auxiliary image frames to focus the image sensor based on the region of interest.

In one or more examples, each auxiliary image frame of the plurality of auxiliary image frames can further include a lower number of bits per pixel than the primary image frame. In some examples, each auxiliary image frame of the plurality of auxiliary image frames can further include a downscaled pixel ratio as compared to the primary image frame. In one or more examples, each auxiliary image frame of the plurality of auxiliary image frames can further include analog pixel binning with respect to the primary image frame. In some examples, the region of interest can be based on user input, object detection, a center of the primary image frame, an area of the scene associated with a gaze of a user, and/or a predetermined distance from the image sensor.

In some examples, the primary image frame can be cropped according to the region of interest. In one or more examples, the processor (e.g., the autofocus processor) can transmit, to the image sensor, the region of interest and a resolution of each auxiliary image frame of the plurality of auxiliary image frames. In one or more examples, the image sensor can adjust parameters of the image sensor, based on the region of interest and the resolution of each auxiliary image frame of the plurality of auxiliary image frames received from the processor.

In one or more examples, the idle time of the image sensor can be a vertical blanking interval. In some examples, the image sensor can be a fast readout sensor. In one or more examples, the processor can include an autofocus processor. For instance, the autofocus processor can be a contrast detection autofocus processor or a phase detection autofocus processor. In some examples, the processing, by the processor (e.g., the autofocus processor), the primary image frame and the plurality of auxiliary image frames can involve contrast detection automatic focusing or phase detection automatic focusing.

In one or more aspects, the systems and techniques have a number of advantages. For example, the systems and techniques provide a new sensor mode for the image sensor to send (e.g., transmit) multiple auxiliary image frames (e.g., during an idle time of the image sensor) to achieve a fast automatic focusing. For another example, the systems and techniques provide flexible specifications for the auxiliary image frames (e.g., the number of auxiliary frames, region of interest, downscaled pixel ratio, and/or bits per pixel) that can provide knobs for trade-offs between autofocus speed (e.g., quality of user experience) and power requirements. For another example, the systems and techniques provide a low cost solution that employs typical image sensors (e.g., not costly and complex PD sensors) with the new sensor mode. For another example, the systems and techniques provide a solution that is SOC area light (e.g., as there is a negligible increase in the sensor and ISP SOC area footprint). For yet another example, the systems and techniques provide a solution that is simple to integrate with the existing autofocus data flow and requires minimal to no architectural change to the hardware.

According to some aspects, the high speed autofocus systems and techniques described herein provide a simple, low-power, and non-expensive solution that achieves a fast autofocus. The systems and techniques can be used for value tier and low tier devices, as well as premium, high-cost devices. For instance, in some examples, the systems and techniques can employ the use of low-cost typical image sensors, not expensive complex PD sensors, which provide additional PD information. As such, the solution is SOC area light and power light, which is needed for value tier and low tier products. In one or more examples, the solution can be implemented into mobile phones (e.g., smartphones), which can lower the cost of the smartphones by replacing the costly complex PD sensors with low cost traditional image sensors.

Additional aspects of the present disclosure are described in more detail below.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the device 105A, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 910 discussed with respect to the computing system 900. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), neural processing units (NPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface), an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/925, read-only memory (ROM) 145/920, a cache 912, a memory unit 915, another storage device 930, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1635, any other input devices 945, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the device 105B and one or more peripheral devices, over which the device 105B may receive data from the one or more peripheral device and/or transmit data to the one or more peripheral devices. The I/O 160 may include one or more wireless transceivers that enable a wireless connection between the device 105B and one or more peripheral devices, over which the device 105B may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

The host processor 152 can configure the image sensor 130 with new parameter settings (e.g., via an external control interface such as I2C, I3C, SPI, GPIO, and/or other interface). In one illustrative example, the host processor 152 can update exposure settings used by the image sensor 130 based on internal processing results of an exposure control algorithm from past image frames.

In some examples, the host processor 152 can perform electronic image stabilization (EIS). For instance, the host processor 152 can determine a motion vector corresponding to motion compensation for one or more image frames. In some aspects, host processor 152 can position a cropped pixel array ("the image window") within the total array of pixels. The image window can include the pixels that are used to capture images. In some examples, the image window can include all of the pixels in the sensor, except for a portion of the rows and columns at the periphery of the sensor. In some cases, the image window can be in the center of the sensor while the image capture device 105A is stationary. In some aspects, the peripheral pixels can surround the pixels of the image window and form a set of buffer pixel rows and buffer pixel columns around the image window. Host processor 152 can implement EIS and shift the image window from frame to frame of video, so that the image window tracks the same scene over successive frames (e.g., assuming that the subject does not move). In some examples in which the subject moves, host processor 152 can determine that the scene has changed.

In some examples, the image window can include at least 95% (e.g., 95% to 99%) of the pixels on the sensor. The first region of interest (ROI) (e.g., used for AE and/or AWB) may include the image data within the field of view of at least 95% (e.g., 95% to 99%) of the plurality of imaging pixels in the image sensor 130 of the image capture device 105A. In some aspects, a number of buffer pixels at the periphery of the sensor (outside of the image window) can be reserved as a buffer to allow the image window to shift to compensate for jitter. In some cases, the image window can be moved so that the subject remains at the same location within the adjusted image window, even though light from the subject may impinge on a different region of the sensor. In another example, the buffer pixels can include the ten topmost rows, ten bottommost rows, ten leftmost columns and ten rightmost columns of pixels on the sensor. In some configurations, the buffer pixels are not used for AF, AE or AWB when the image capture device 105A is stationary and the buffer pixels not included in the image output. If jitter moves the sensor to the left by twice the width of a column of pixels between frames, the EIS algorithm can be used to shift the image window to the right by two columns of pixels, so the captured image shows the same scene in the next frame as in the current frame. Host processor 152 can use EIS to smoothen the transition from one frame to the next.

In some aspects, the host processor 152 can also dynamically configure the parameter settings of the internal pipelines, engines, or modules of the ISP 154 to match the settings of one or more input image frames from the image sensor 130 so that the image data is correctly processed by the ISP 154. Processing (or pipeline) blocks, engines, or modules of the ISP 154 can include engines or modules for lens/sensor noise correction, de-mosaicing, color conversion, correction or enhancement/suppression of image attributes, denoising filters, sharpening filters, among others. The settings of different engines or modules of the ISP 154 can be configured by the host processor 152. Each engine or module may include a large number of tunable parameter settings. Additionally, engines or modules may be co-dependent as different engines or modules may affect similar aspects of an image. For example, denoising and texture correction or enhancement may both affect high frequency aspects of an image. As a result, a large number of parameters are used by an ISP to generate a final image from a captured raw image.

In some cases, the image capture and processing system 100 may perform one or more of the image processing functionalities described above automatically. For instance, one or more of the control mechanisms 120 may be configured to perform auto-focus operations, auto-exposure operations, and/or auto-white-balance operations. In some embodiments, an auto-focus functionality allows the image capture device 105A to focus automatically prior to capturing the desired image. Various auto-focus technologies exist. For instance, active autofocus technologies determine a range between a camera and a subject of the image via a range sensor of the camera, typically by emitting infrared lasers or ultrasound signals and receiving reflections of those signals. In addition, passive auto-focus technologies use a camera's own image sensor to focus the camera, and thus do not require additional sensors to be integrated into the camera. Passive AF techniques include Contrast Detection Auto Focus (CDAF), Phase Detection Auto Focus (PDAF), and in some cases hybrid systems that use both. The image capture and processing system 100 may be equipped with these or any additional type of auto-focus technology.

Figure 2:
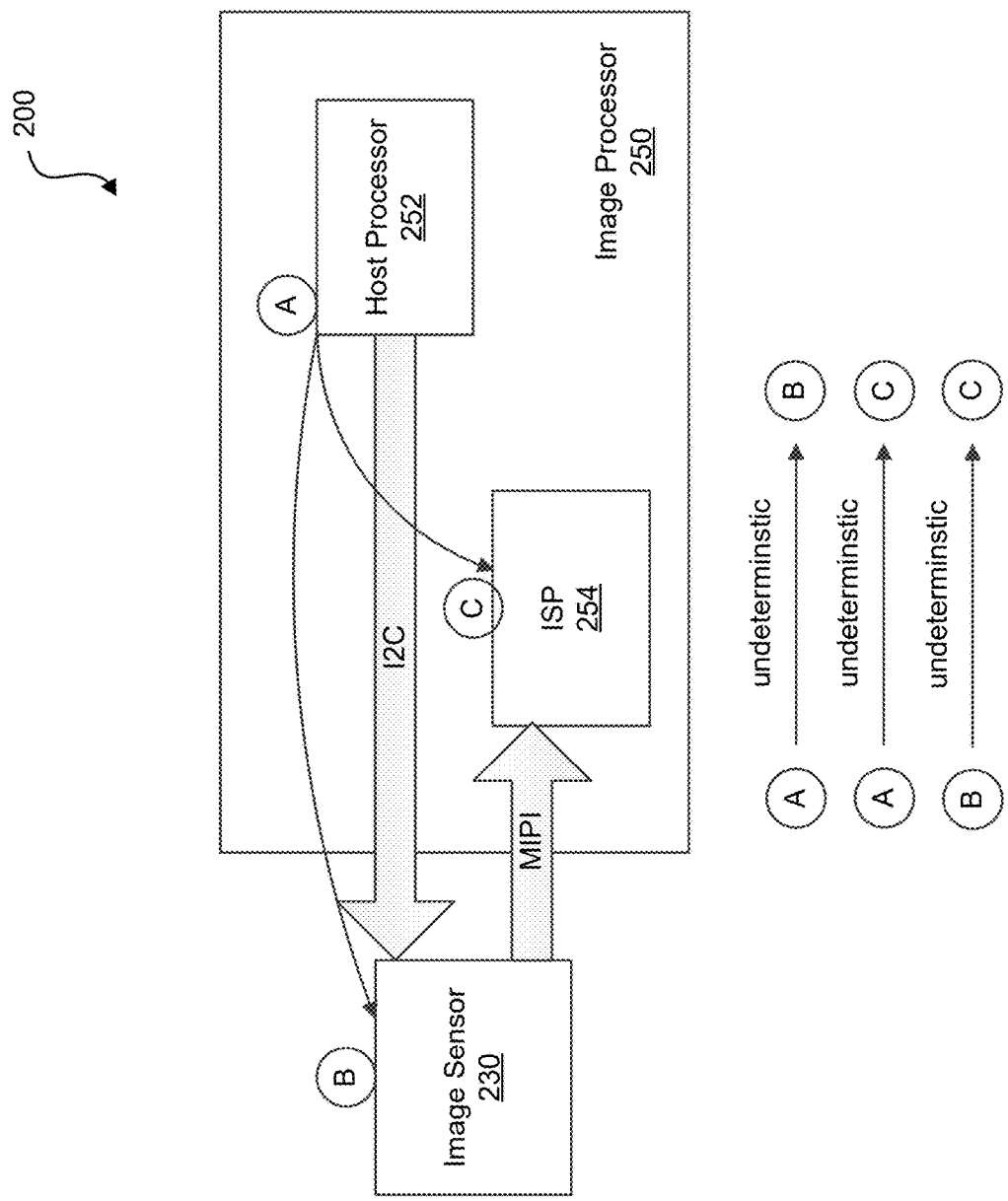
FIG. 2 is a block diagram illustrating an example of interactions between components of an image capture and processing system, in accordance with some examples.

Synchronization between the image sensor 130 and the ISP 154 is important in order to provide an operational image capture system that generates high quality images without interruption and/or failure. FIG. 2 is a block diagram illustrating an example of an image capture and processing system 200 including an image processor 250 (including host processor 252 and ISP 254) in communication with an image sensor 230. The configuration shown in FIG. 2 is illustrative of traditional synchronization techniques used in camera systems. In general, the host processor 252 attempts to provide synchronization between the image sensor 230 and the ISP 254 using fixed periods of time by separately communicating with the image sensor 230 and the ISP 254. For example, in traditional camera systems, the host processor 252 communicates with the image sensor 230 (e.g., over an I2C port) and programs the image sensor 230 parameters with a first fixed period of time, such as 2-frame periods ahead of when that image frame will be processed by the ISP 254. The host processor 252 communicates with the ISP 254 (e.g., over an internal AHB bus or other interface) and programs the ISP 254 parameter settings with a second fixed period of time, such as 1-frame period ahead of when that image frame will be processed by the ISP 254.

The image sensor 230 can send image frames to the ISP 254 (B-to-C in FIG. 2), such as over an MIPI CSI-2 PHY port or interface, or other suitable interface. However, the communication between the host processor 252 and the image sensor 230 (shown as from A to B) is undeterministic.

Similarly, the communication between the image sensor 230 and the ISP 254 (shown as from B to C) and the communication the host processor 252 and the ISP 254 (shown as from A to C) are also undeterministic. For example, there can be varying latencies in programming of the image sensor 230 and the ISP 254 by the host processor 252, which can result in a parameter settings mismatch between the sensor and the ISP. The latencies can be due to high CPU usage, congestion in one or more I/O ports, and/or due to other factors.

Figure 3:
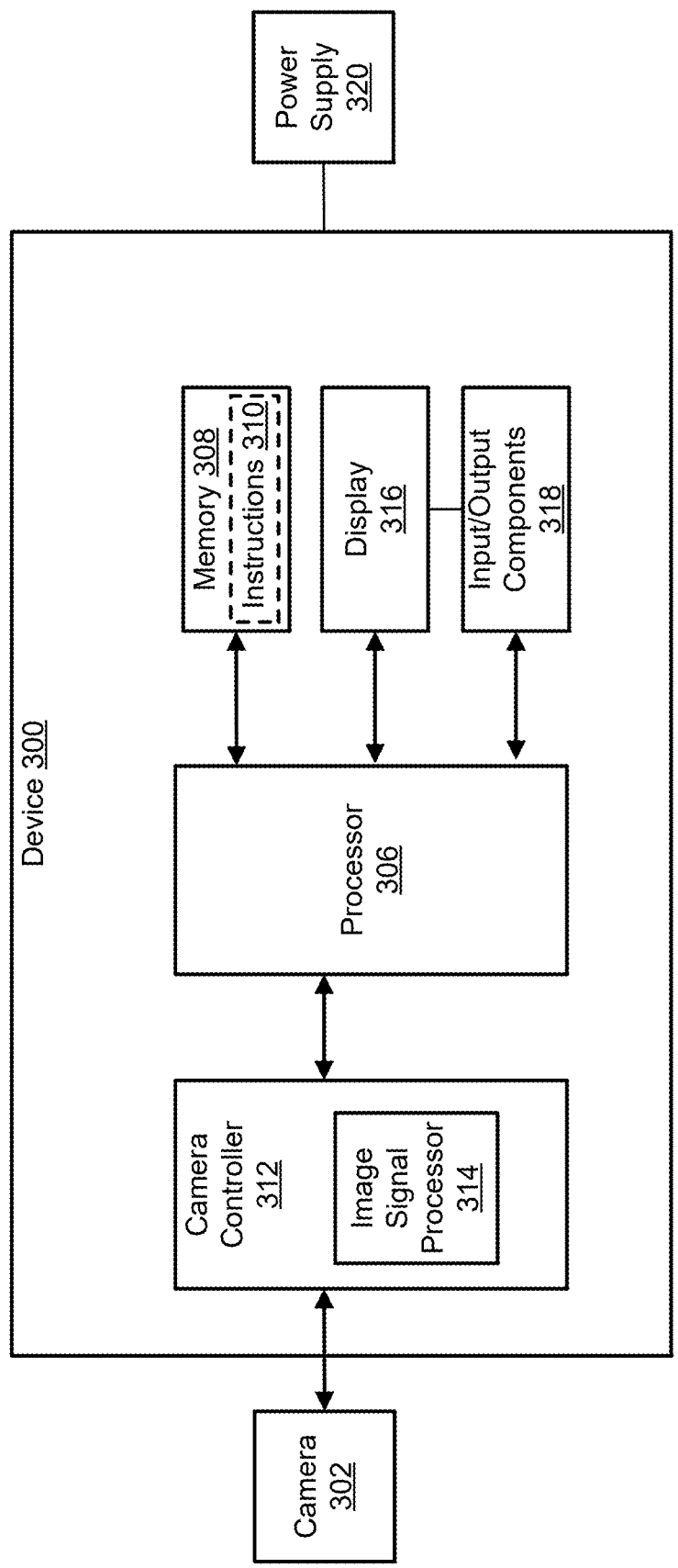
FIG. 3 is a block diagram of an example device that may be used for high speed autofocus for images, in accordance with some examples.

FIG. 3 is a block diagram of an example device 300 that may be used for contrast-based high speed autofocus. Device 300 may include or may be coupled to a camera 302, and may further include a processor 306, a memory 308 storing instructions 310, a camera controller 312, a display 316, and a number of input/output (I/O) components 318 including one or more microphones (not shown). The example device 300 may be any suitable device capable of capturing and/or storing images or video including, for example, wired and wireless communication devices (such as camera phones, smartphones, tablets, security systems, smart home devices, connected home devices, surveillance devices, internet protocol (IP) devices, dash cameras, laptop computers, desktop computers, automobiles, and so on), digital cameras (including still cameras, video cameras, and so on), or any other suitable device. The device 300 may include additional features or components not shown. For example, a wireless interface, which may include a number of transceivers and a baseband processor, may be included for a wireless communication device. Device 300 may include or may be coupled to additional cameras other than the camera 302. The disclosure should not be limited to any specific examples or illustrations, including the example device 300.

Camera 302 may be capable of capturing individual image frames (such as still images) and/or capturing video (such as a succession of captured image frames). Camera 302 may include one or more image sensors (not shown for simplicity) and shutters for capturing an image frame and providing the captured image frame to camera controller 312. Although a single camera 302 is shown, any number of cameras or camera components may be included and/or coupled to device 300. For example, the number of cameras may be increased to achieve greater depth determining capabilities or better resolution for a given FOV.

Memory 308 may be a non-transient or non-transitory computer readable medium storing computer-executable instructions 310 to perform all or a portion of one or more operations described in this disclosure. Device 300 may also include a power supply 320, which may be coupled to or integrated into the device 300.

Processor 306 may be one or more suitable processors capable of executing scripts or instructions of one or more software programs (such as the instructions 310) stored within memory 308. In some aspects, processor 306 may be one or more general purpose processors that execute instructions 310 to cause device 300 to perform any number of functions or operations. In additional or alternative aspects, processor 306 may include integrated circuits or other hardware to perform functions or operations without the use of software. While shown to be coupled to each other via processor 306 in the example of FIG. 3, processor 306, memory 308, camera controller 312, display 316, and I/O components 318 may be coupled to one another in various arrangements. For example, processor 306, memory 308, camera controller 312, display 316, and/or I/O components 318 may be coupled to each other via one or more local buses (not shown for simplicity).

Display 316 may be any suitable display or screen allowing for user interaction and/or to present items (such as captured images and/or videos) for viewing by the user. In some aspects, display 316 may be a touch-sensitive display. Display 316 may be part of or external to device 300. Display 316 may comprise an LCD, LED, OLED, or similar display. I/O components 318 may be or may include any suitable mechanism or interface to receive input (such as commands) from the user and/or to provide output to the user. For example, I/O components 318 may include (but are not limited to) a graphical user interface, keyboard, mouse, microphone and speakers, and so on.

Camera controller 312 may include an image signal processor (ISP) 314, which may be (or may include) one or more image signal processors to process captured image frames or videos provided by camera 302. For example, ISP 314 may be configured to perform various processing operations for automatic focus (AF), automatic white balance (AWB), and/or automatic exposure (AE), which may also be referred to as automatic exposure control (AEC). Examples of image processing operations include, but are not limited to, cropping, scaling (e.g., to a different resolution), image stitching, image format conversion, color interpolation, image interpolation, color processing, image filtering (e.g., spatial image filtering), and/or the like.

In some example implementations, camera controller 312 (such as the ISP 314) may implement various functionality, including imaging processing and/or control operation of camera 302. In some aspects, ISP 314 may execute instructions from a memory (such as instructions 310 stored in memory 308 or instructions stored in a separate memory coupled to ISP 314) to control image processing and/or operation of camera 302. In other aspects, ISP 314 may include specific hardware to control image processing and/or operation of camera 302. ISP 314 may alternatively or additionally include a combination of specific hardware and the ability to execute software instructions.

While not shown in FIG. 3, in some implementations, ISP 314 and/or camera controller 312 may include an AF engine, an AWB engine, and/or an AE engine. ISP 314 and/or camera controller 312 may be configured to execute an AF process, an AWB process, and/or an AE process. In some examples, ISP 314 and/or camera controller 312 may include hardware-specific circuits (e.g., an application-specific integrated circuit (ASIC)) configured to perform the AF, AWB, and/or AE processes. In other examples, ISP 314 and/or camera controller 312 may be configured to execute software and/or firmware to perform the AF, AWB, and/or AE processes. When configured in software, code for the AF, AWB, and/or AE processes may be stored in memory (such as instructions 310 stored in memory 308 or instructions stored in a separate memory coupled to ISP 314 and/or camera controller 312). In other examples, ISP 314 and/or camera controller 312 may perform the AF, AWB, and/or AE processes using a combination of hardware, firmware, and/or software. When configured as software, AF, AWB, and/or AE processes may include instructions that configure ISP 314 and/or camera controller 312 to perform various image processing and device managements tasks, including the techniques of this disclosure.

Figure 4:
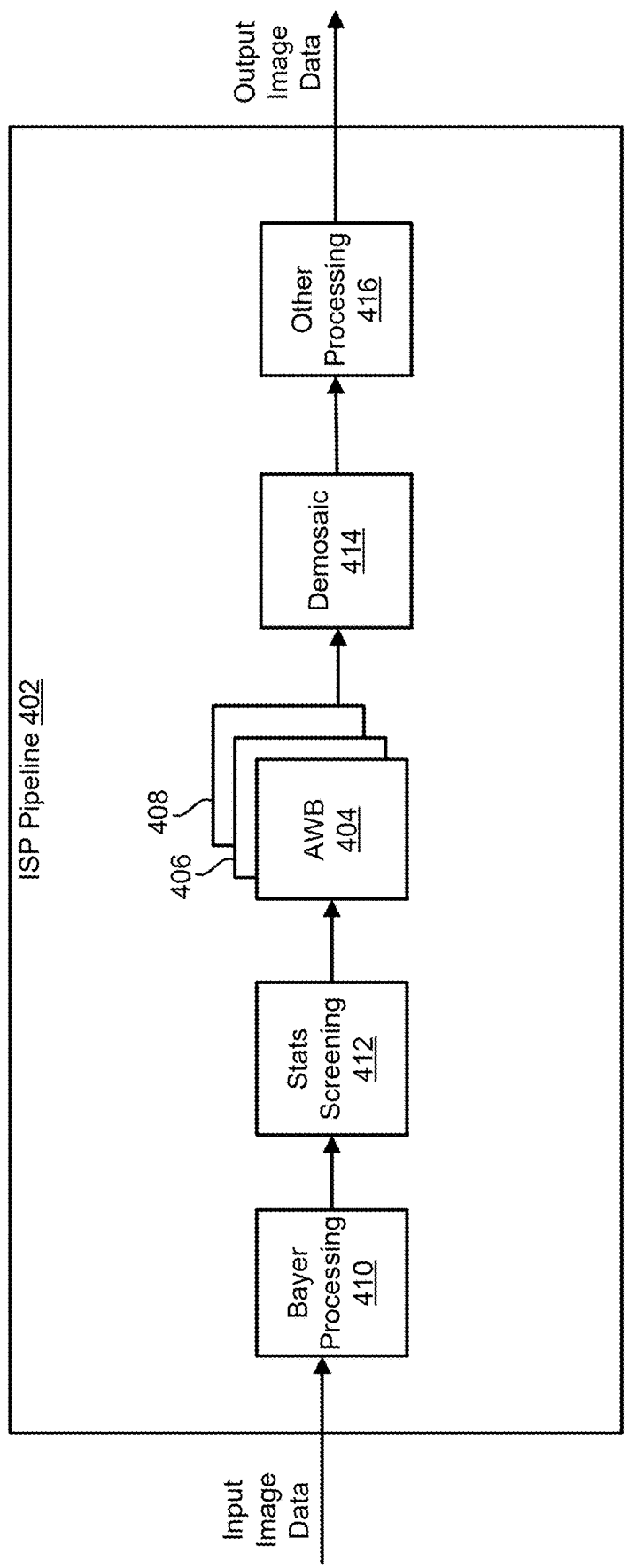
FIG. 4 is a block diagram showing the operation of an image signal processor pipeline, in accordance with some examples.

FIG. 4 is a block diagram showing the operation of an image signal processing pipeline 402 of an image signal processor (e.g., the ISP 314). For example, the ISP 314 may be configured to execute the image signal processing pipeline 402 to process input image data. The ISP 314 may receive the input image data from camera 302 of FIG. 3 and/or an image sensor (not shown) of camera 302. In some examples, such as shown in FIG. 4, the input image data may include color data of the image/frame and/or any other data (e.g., depth data). In the example of FIG. 4, the color data received for the input image data may be in a Bayer format. Rather than capturing red (R), green (G), and blue (B) values for each pixel of an image, image sensors (e.g., an image sensor of camera 302) may use a Bayer filter mosaic (or more generally, a color filter array (CFA)), where each photosensor of a digital image sensor captures a different one of the RGB colors. One example of a filter pattern for a Bayer filter mosaic may include 50% green filters, 25% red filters, and 25% blue filters.

Bayer processing unit 410 may perform one or more initial processing techniques on the raw Bayer data received by ISP 314, including, for example, subtraction, rolloff correction, bad pixel correction, black level compensation, and/or denoising.

Stats screening process 412 may determine Bayer grade or Bayer grid (BG) statistics of the received input image data. In some examples, BG statistics may include a red color to green color ratio (R/G) (which may indicate whether a red tinting exists and the magnitude of the red tinting that may exist in an image) and/or a blue color to green color ratio (B/G) (which may indicate whether a blue tinting exists and the magnitude of the blue tinting that may exist in an image). For example, the (R/G) for an image or a portion/region of an image may be depicted by equation (1) below:

$$R/G = \frac{\sum_{n=1}^{N} \text{Red}(n)}{\sum_{n=1}^{N} \text{Green}(n)} \quad (1)$$

where the image or a portion/region of the image includes pixels 1-N, each pixel n includes a red value Red(n), a blue value Blue(n), or a green value Green(n) in an RGB space. The (R/G) is the sum of the red values for the red pixels in the image divided by the sum of the green values for the green pixels in the image. Similarly, the (B/G) for the image or a portion/region of the image may be depicted by equation (2) below:

$$B/G = \frac{\sum_{n=1}^{N} \text{Blue}(n)}{\sum_{n=1}^{N} \text{Green}(n)} \quad (2)$$

In some other example implementations, a different color space may be used, such as Y'UV, with chrominance values UV indicating the color, and/or other indications of a tinting or other color temperature effect for an image may be determined.

AWB engine and/or process 404 may analyze information relating to the received image data to determine an illuminant of the scene, from among a plurality of possible illuminants, and may determine an AWB gain to apply to the received image and/or a subsequent image based on the determined illuminant. White balance is a process used to try to match colors of an image with a user's perceptual experience of the object being captured. As an example, the white balance process may be designed to make white objects actually appear white in the processed image and gray objects actually appear gray in the processed image.

An illuminant may include a lighting condition, a type of light, etc. of the scene being captured. In some examples, a user of an image capture device (e.g., such as device 300 of FIG. 3) may select or indicate an illuminant under which an image was captured. In other examples, the image capture device itself may automatically determine the most likely illuminant and perform white balancing based on the determined illuminant (e.g., lighting condition). In order to better render the colors of a scene in a captured image or video, an AWB algorithm on a device and/or camera may attempt to determine the illuminants of the scene and set/adjust the white balance of the image or video accordingly.

Device 300, during the AWB process 404, may determine or estimate a color temperature for a received frame (e.g., image). The color temperature may indicate a dominant color tone for the image. The true color temperature for a scene being captured in a video or image is the color of the light sources for the scene. If the light is radiation emitted from a perfect blackbody radiator (theoretically ideal for all electromagnetic wavelengths) at a particular color temperature (represented in Kelvin (K)), and the color temperatures are known, then the color temperature for the scene is known. For example, in a Commission Internationale de l'éclairage (CIE) defined color space (from 1931), the chromaticity of radiation from a blackbody radiator with temperatures from 1,000 to 20,000 K is the Planckian locus. Colors on the Planckian locus from approximately 2,000 K to 20,000 K are considered white, with 2,000 K being a warm or reddish white and 20,000 K being a cool or bluish white. Many incandescent light sources include a Planckian radiator (tungsten wire or another filament to glow) that emits a warm white light with a color temperature of approximately 2,400 to 3,100 K.

However, other light sources, such as fluorescent lights, discharge lamps, or light emitting diodes (LEDs), are not perfect blackbody radiators whose radiation falls along the Planckian locus. For example, an LED or a neon sign emit light through electroluminescence, and the color of the light does not follow the Planckian locus. The color temperature determined for such light sources may be a correlated color temperature (CCT). The CCT is the estimated color temperature for light sources whose colors do not fall exactly on the Planckian locus. For example, the CCT of a light source is the blackbody color temperature that is closest to the radiation of the light source. CCT may also be denoted in K.

CCT may be an approximation of the true color temperature for the scene. For example, the CCT may be a simplified color metric of chromaticity coordinates in the CIE 1931 color space. Many devices may use AWB to estimate a CCT for color balancing.

The CCT may be a temperature rating from warm colors (such as yellows and reds below 3200 K) to cool colors (such as blue above 4000 K). The CCT (or other color temperature) may indicate the tinting that will appear in an image captured using such light sources. For example, a CCT of 2700 K may indicate a red tinting, and a CCT of 5000 K may indicate a blue tinting.

Different lighting sources or ambient lighting may illuminate a scene, and the color temperatures may be unknown to the device. As a result, the device may analyze data captured by the image sensor to estimate a color temperature for an image (e.g., a frame). For example, the color temperature may be an estimation of the overall CCT of the light sources for the scene in the image. The data captured by the image sensor used to estimate the color temperature for a frame (e.g., image) may be the captured image itself.

After device 300 determines a color temperature for the scene (such as during performance of AWB), device 300 may use the color temperature to determine a color balance for correcting any tinting in the image. For example, if the color temperature indicates that an image includes a red tinting, device 300 may decrease the red value or increase the blue value for each pixel of the image, e.g., in an RGB space. The color balance may be the color correction (such as the values to reduce the red values or increase the blue values).

Example inputs to AWB process 404 may include the Bayer grade or Bayer grid (BG) statistics of the received image data determined via stats screening process 412, an exposure index (e.g., the brightness of the scene of the received image data), and auxiliary information, which may include the contextual information of the scene based on the audio input (as will be discussed in further detail below), depth information, etc. It should be noted that AWB process 404 may be included within camera controller 312 of FIG. 3 as a separate AWB engine.

AE process 406 may include instructions for configuring, calculating, and/or storing an exposure setting of camera 302 of FIG. 3. An exposure setting may include an amount of sensor gain to be applied, an amount of digital gain to be applied, shutter speed and/or exposure time, an aperture setting, and/or an ISO setting to use to capture subsequent images. AE process 406 may use the audio input and/or the contextual information of the scene based on the audio input to determine and/or apply exposure settings faster. It should be noted that AE process 406 may be included within camera controller 312 of FIG. 3 as a separate AE engine.

AF process 408 may include instructions for configuring, calculating and/or storing an auto focus setting of camera 302 of FIG. 3. AF process 408 may determine the auto focus setting (e.g., an initial lens position, a final lens position, etc.) based on the audio input and/or the contextual information of the scene based on the audio input. It should be noted that AF process 408 may be included within camera controller 312 of FIG. 3 as a separate AF engine.

Demosaic processing unit 414 may be configured to convert the processed Bayer image data into RGB values for each pixel of an image. As explained above, Bayer data may only include values for one color channel (R, G, or B) for each pixel of the image. Demosaic processing unit 414 may determine values for the other color channels of a pixel by interpolating from color channel values of nearby pixels. In some ISP pipelines 402, demosaic processing unit 414 may come before AWB, AE, and/or AF processes 404, 406, 408 or after AWB, AE, and/or AF processes 404, 406, 408.

Other processing unit 416 may apply additional processing to the image after AWB, AE, and/or AF processes 404, 406, 408 and/or demosaic processing unit 414. The additional processing may include color, tone, and/or spatial processing of the image.

As previously mentioned, for image processing, automatic focusing (autofocus) may be used to focus an image. Existing solutions for autofocus include PDAF and CDAF. PDAF detects where light rays meet when entering the image sensor to ensure that objects are in focus. CDAF measures the intensity difference (contrast) between adjacent pixels of the image sensor and adjusts for the maximal contrast to correct the image focus. CDAF requires a plurality of image frames to find contrast peaks for the automatic focusing.

PDAF has the benefit of providing a faster automatic focusing than CDAF (e.g., or laser assisted autofocus techniques). However, PDAF requires costly and complex PD sensors, which have PD pixels that provide additional phase detection information. To process this additional phase detection information, additional hardware in the ISP is required. This additional hardware increases the ISP SOC area footprint. For these two reasons (e.g., requirement of costly complex sensors and additional hardware in ISP), PDAF is predominately implemented in premium tier products, where the quality of autofocus and the speed of autofocus are critical to provide for a premier user experience.

In contrast to PDAF, CDAF is a low cost autofocus solution that utilizes typical image sensors, which do not provide additional data. As such, CDAF does not require additional hardware in the ISP for processing and, thus, the ISP SOC area needed for CDAF is smaller than that of for PDAF. However, CDAF has the disadvantage of achieving focus at a slower rate as compared to PDAF and, as such, CDAF provides a lower quality user experience than PDAF. Thus, CDAF is usually employed in value tier and lower tier products due to its low cost.

A solution that can provide for a fast automatic focusing (e.g., similar to PDAF) for value tier and low tier products at a low cost is desirable. A solution that can provide these requirements can be used to create product differentiation for these types of low cost products. Therefore, improved systems and techniques that provide for fast automatic focusing at a low cost can be useful.

In one or more aspects, the systems and techniques provide for contrast-based high speed autofocus. In one or more examples, the systems and techniques provide a simple low-power non-expensive solution that achieves a fast autofocus and is focused on low cost value tier and low tier products. In one or more examples, the solution utilizes low-cost typical image sensors, not expensive complex PD sensors, which provide additional PD information. As such, the solution is SOC area light and power light, which is needed for low cost value tier and low tier products. In one or more examples, the solution may be implemented into mobile devices (e.g., smartphones), which can lower the cost of the mobile devices by replacing the costly complex PD sensors with low cost traditional image sensors.

In one or more examples, the systems and techniques provide a new sensor mode (e.g., for CDAF) for the image sensor to send multiple, low resolution, auxiliary image frames corresponding to a region of interest (ROI) (e.g., a face) during an idle time (e.g., a vertical blanking interval (VBI)) of the image sensor to achieve a fast autofocus. These multiple, low resolution, auxiliary image frames (e.g., mini image frames) may be processed (e.g., for CDAF) at a much higher speed than primary image frames (e.g., full image frames) and can be output between successive primary image frames for preview. In one or more examples, the solution using auxiliary image frames may also be implemented for PDAF to improve the PDAF performance (e.g., improvement from requiring two to three primary image frames for autofocusing to only needing one primary image frame for autofocusing).

In some examples, the solution provides knobs (e.g., choices, such as a ROI, scale ratio, and/or bits per pixel for the auxiliary image frames) to OEMs that may be utilized (e.g., adjusted) for a trade-off between the autofocus speed (e.g., the quality of the user experience) and the required power. For example, there may be scenarios where the power requirement is not critical and, thus, additional power can be consumed and a faster autofocus can be achieved. Conversely, there may be scenarios where the power criteria is critical and a slower autofocus is acceptable.

In one or more aspects, during operation of the systems and techniques for image processing, an image sensor (e.g., sensor 740 of FIG. 7) of a camera device (e.g., the image and processing system 100 of FIG. 1) may obtain a primary image frame (e.g., primary image frame 710*a* of FIG. 7) of a scene (e.g., which may include a person's face). The image sensor, during an idle time of the image sensor (e.g., a VBI), may obtain a plurality of auxiliary image frames (e.g., auxiliary image frames 720 of FIG. 7) of the scene. In one or more examples, each auxiliary image frame of the plurality of auxiliary image frames may correspond to a ROI (e.g., the face of the person) in the scene and may include a lower resolution than the primary image frame. An autofocus processor (e.g., within an autofocus (AF) engine 780 of FIG. 7, such as a CDAF engine) may process the primary image frame and the plurality of auxiliary image frames to focus the image sensor (e.g., adjust a lens position of the image sensor to capture one or more additional image frames, such as an additional primary image frame) based on the ROI.

In one or more examples, each auxiliary image frame of the plurality of auxiliary image frames may further include a lower number of bits per pixel (BPP) than the primary image frame. In some examples, each auxiliary image frame of the plurality of auxiliary image frames may further include a downscaled (DS) pixel ratio as compared to the primary image frame. In one or more examples, each auxiliary image frame of the plurality of auxiliary image frames may further include analog pixel binning with respect to the primary image frame. In some examples, the ROI may be based on user input, object detection, a center of the primary image frame, an area of the scene associated with a gaze of a user (e.g., an area of the scene that one or more eyes of a user is focused on), and/or a predetermined distance (e.g., a range) from the image sensor.

In some examples, the primary image frame may be cropped according to the ROI. In one or more examples, the autofocus processor may transmit, to the image sensor, the ROI and a resolution of each auxiliary image frame of the plurality of auxiliary image frames. In one or more examples, the image sensor may adjust parameters of the image sensor, based on the ROI and the resolution of each auxiliary image frame of the plurality of auxiliary image frames received from the autofocus processor.

In one or more examples, the idle time of the image sensor may be a vertical blanking interval (VBI). In some examples, the image sensor may be a fast readout sensor (FRS). In one or more examples, the autofocus processor may be a CDAF processor or a PDAF processor. In some examples, the processing, by the autofocus processor, the primary image frame and the plurality of auxiliary image frames may involve CDAF or PDAF.

A fast readout sensor outputs image data in a very short time interval. For instance, using a 30 frames per second (FPS) fast readout sensor, where in each frame duration is 33 milliseconds (ms), the frame data may be output during an active frame time (e.g., an initial eight milliseconds) and the rest of the 33 ms time window (25 milliseconds) is an idle time, which can be referred to as the vertical blanking interval (VBI). Compared to the frame duration, there is a significantly large amount of vertical blanking interval time. As described herein, the systems and techniques can make use of the large idle time to incorporate autofocus into the sensor. For instance, the sensor can output auxiliary images during the idle time (e.g., during the VBI), which can be used along with a primary image output during the active frame time (e.g., during the first 8 ms of the 33 ms total frame duration).

Figure 5:
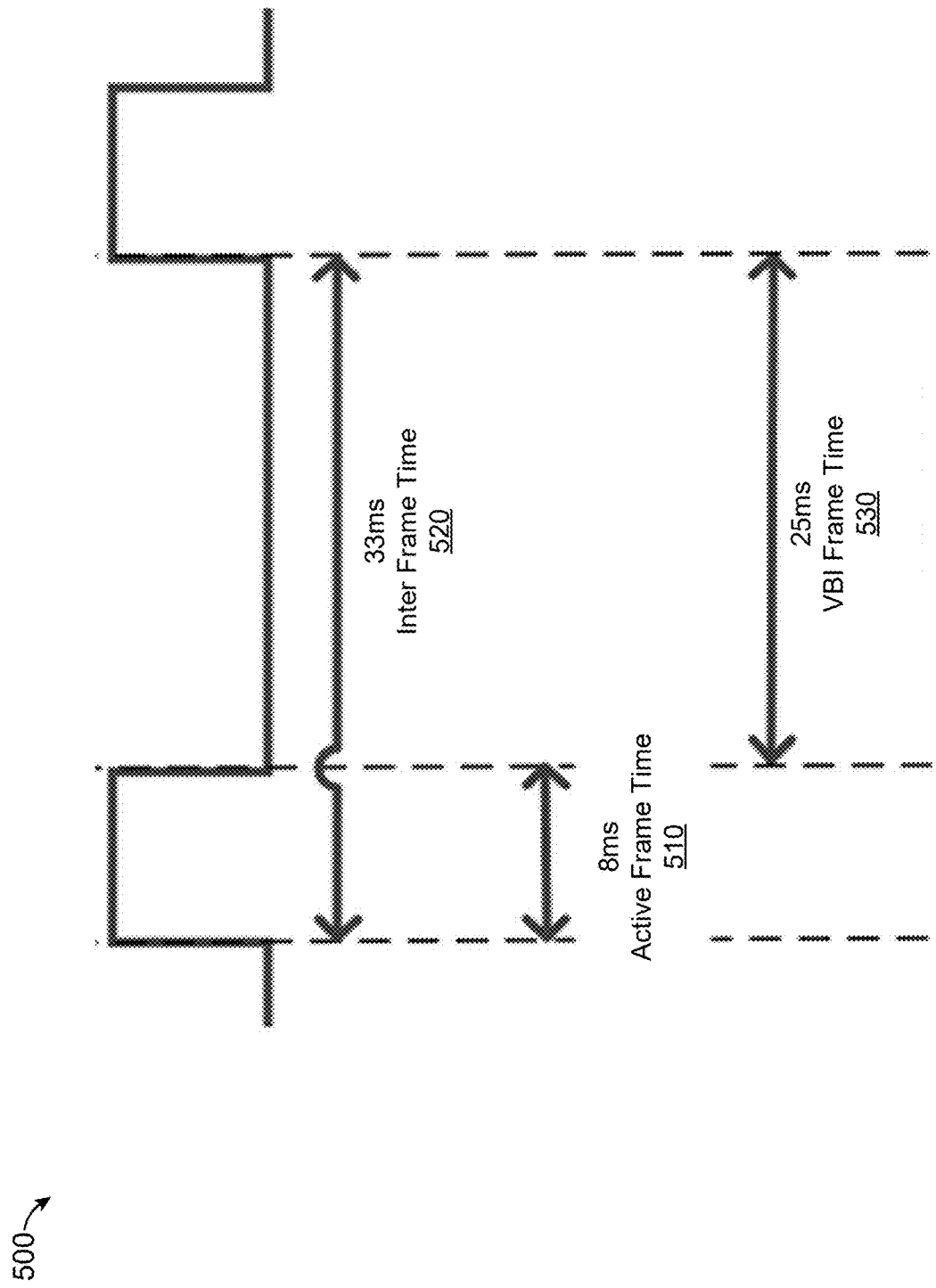
FIG. 5 is a graph showing an example of an image frame time of an fast readout sensor, in accordance with some examples.

FIG. 5 is a graph 500 showing an example of an image frame time of a fast readout sensor showing a large idle time (e.g., VBI). In the graph 500 of FIG. 5, the x-axis denotes time, and the y-axis denotes image sensor activity. In the graph 500, each pulse interval is the active frame time 510 (e.g., the amount of time that the image sensor is actively obtaining and outputting an image frame of a scene, for example a primary image frame).

In the example shown in FIG. 5, the image sensor is a 30 frames per second (FPS) image sensor, where each image frame duration (e.g., inter frame time 520) is 33 milliseconds. However, the image frame data (e.g., primary image frame data) is sent only during the pulse intervals (e.g., during the pulse interval of the initial eight milliseconds). The rest of the window (e.g., the image frame duration) that is 25 milliseconds is the VBI time 530 (e.g., an idle time for the image sensor with no activity by the image sensor occurring).

As such, compared to the active frame time 510 (e.g., eight milliseconds), there is a significantly larger VBI time 530 (e.g., 25 milliseconds). The systems and techniques make use of this VBI time 530 to incorporate a new mode into the image sensor. As such, during this VBI time 530, a plurality of auxiliary image frames of the scene can be obtained and outputted (e.g., transmitted) by the image sensor. Thus, the image sensor (e.g., a single image sensor) can obtain and output a primary image frame of the scene during the active frame time 510 and, then, can obtain and output a plurality of auxiliary image frames of the scene during the VBI time 530.

Figure 6:
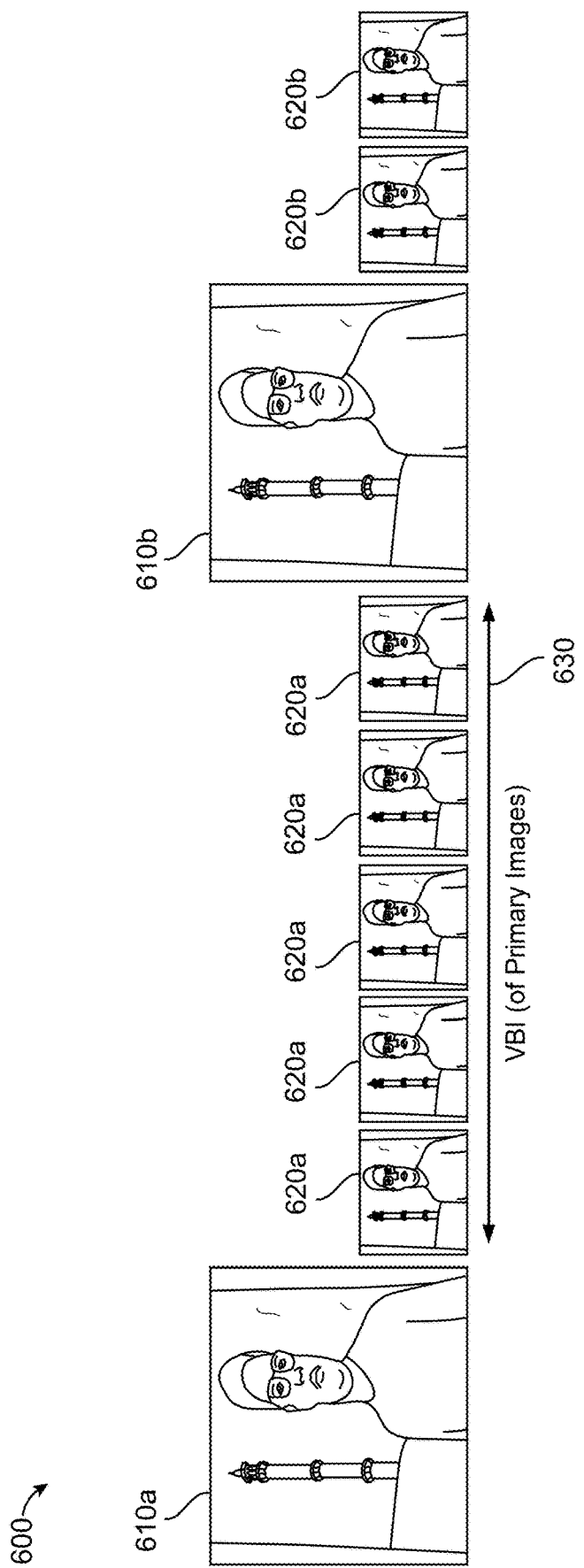
FIG. 6 is a diagram showing an example of a plurality of auxiliary image frames being outputted by an image sensor following the output of a primary image frame by the image sensor, in accordance with some examples.

FIG. 6 is a diagram showing an example 600 of a plurality of auxiliary image frames being output by an image sensor following the output of a primary image frame by the image sensor. In FIG. 6, primary image frames 610*a*, 610*b* of a scene and a plurality of auxiliary image frames 620*a*, 620*b* of the scene are shown. In one or more examples, the primary image frames 610*a*, 610*b* can be used for preview and video. In some examples, the auxiliary image frames 620*a*, 620*b* (e.g., along with the primary image frames 610*a*, 610*b*) can be used for CDAF.

In one or more examples, during an image frame duration (e.g., inter frame time 520 of FIG. 5) for an image sensor, an image sensor can obtain and output the primary image frame 610*a* of a scene (e.g., including a person) during the active frame time (e.g., active frame time 510 of FIG. 5) of the image sensor. The image sensor can then obtain and output a plurality of auxiliary image frames 620*a* of the scene during the subsequent VBI time (e.g., VBI time 530 of FIG. 5) for the image sensor. The image sensor can then repeat the process for a subsequent image frame duration.

In some examples, the primary image frames 610*a*, 610*b* have a number of different attributes, such as a typical resolution and bits per pixel (BPP). In one or more examples, the primary image frames 610*a*, 610*b* may be unscaled images.

The sensor mode proposed for the image sensor is applicable to the auxiliary image frames 620*a*, 620*b*, which are sent during the VBI time. The resolution (e.g., the height and width of the image) and the BPP of the auxiliary image frames 620*a*, 620*b* are lower than the resolution and the BPP of the primary image frames 610*a*, 610*b*, but are sufficiently high enough for determining contrast automatic focusing. Utilizing these auxiliary image frames 620*a*, 620*b* for CDAF can allow for a savings in power (e.g., because there is a smaller amount of data to process by the same set of hardware) without impacting the autofocusing quality.

In one or more examples, specifications for the auxiliary image frames 620a, 620b can be configurable. In some examples, the specifications can include the number of auxiliary images 620a, 620b to be sent during the VBI time, the ROI (e.g., the face of the person in the scene), the downscale (DS) ratio, the BPP, and/or analog pixel binning (e.g., a two by two binning, where there is one representative value for every two by two set of pixels in the image sensor). In one or more examples, the specifications for the auxiliary image frames 620a, 620b can be configured to the image sensor prior to the image sensor obtaining the primary image frames 610a, 610b and/or the auxiliary image frames 620a, 620b.

Based on the specifications of the auxiliary image frames 620a, 620b, the image sensor can perform a number of actions, including cropping the ROI (e.g., the face) from the primary image frame 610a, 610b, downscaling the primary image frame 610a, 610b, and/or sending the most significant bits (MSB) of the BPP.

In one or more examples, the auxiliary image frames 620a, 620b can be generated by downscaling the primary image frame 610a, 610b. For example, a primary image frame can be downscaled one by two, which is down sampling by two, where only every other alternate line of pixels is sampled.

In some examples, the auxiliary image frames 620a, 620b can be generated by sending the MSB of the BPP. For example, in the case of a 14 BPP primary image frame and auxiliary image frames with a specification of BPP of eight pixels, the lower (e.g., lower value, dimmer) six bits (e.g., which contain the finer level details in the image) of the primary image frame can be dropped, and only the upper (e.g., higher value, brighter) eight bits of the primary image frame, which correspond to the intensity values that are of interest for contrast, can be sent (e.g., used to generate an auxiliary image frame).

In one or more examples, the image sensor can generate an auxiliary image frame by first cropping a primary image frame according to the ROI to produce a cropped image frame. The image sensor can then downscale that cropped image frame to produce a downscaled cropped image frame. The image sensor can then reduce the BPP for the downscaled cropped image frame to produce the auxiliary image frame.

In some examples, the ROI can be determined based on user input (e.g., a specification by a user), an object detected by object detection, an area (e.g., center) of the primary image frame, a location in the scene where one or more eyes of a user is focused on, and/or a location located at a fixed distance (e.g., range) from the image sensor (e.g., for automobile use cases).

Due to the multiple auxiliary image frames 620a, 620b being sent (e.g., transmitted) during the VBI time, the solution (e.g., CDAF solution) will be able to achieve a faster autofocus as compared to the existing CDAF approach of using only the primary image frames 610a, 610b.

Figure 7:
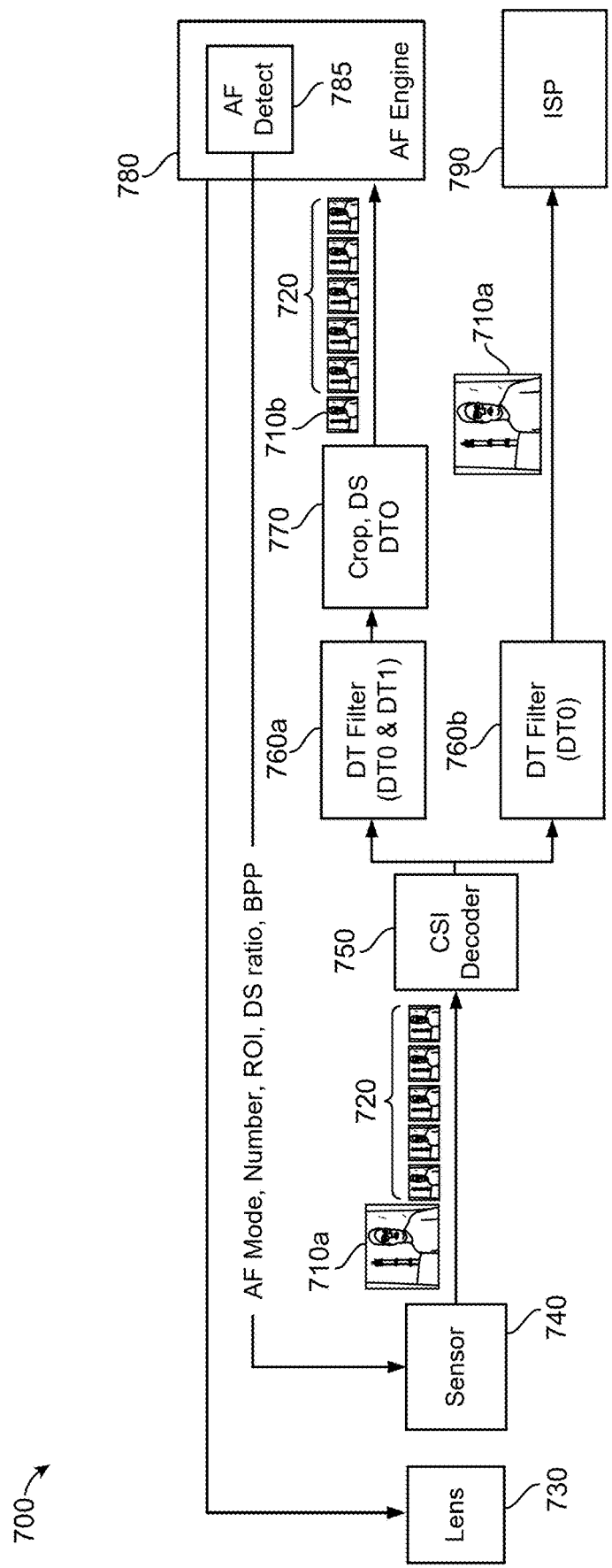
FIG. 7 is a diagram showing an example of a process for high speed autofocus for images, in accordance with some examples.

FIG. 7 is a diagram showing an example of a system 700 for contrast-based high speed autofocus. In FIG. 7, a lens 730 (e.g., a camera lens), a sensor 740 (e.g., an image sensor), a camera serial interface (CSI) decoder 750, data type (DT) filters 760a, 760b, a cropping engine 770, an autofocus AF engine 780, an autofocus detection engine 785, and an ISP 790 are shown. In one or more examples, the sensor 740 may be a fast readout sensor (FRS). IN some cases, the AF engine 780 can be a CDAF engine.

During operation of the system 700, when the autofocus detection engine 785 (e.g., an autofocus processor, which may be within the autofocus detect engine 785) identifies an image (e.g., a primary image frame) that is not in focus, the autofocus detection engine 785 (e.g., the autofocus processor) can request the sensor 740 (e.g., of a camera device, such as the image and processing system 100 of FIG. 1) to transition (e.g., switch) to an autofocus sensor mode, and to obtain and send (e.g., output and transmit) auxiliary image frames (e.g., auxiliary image frames 720) of a certain specification (e.g., number of auxiliary frames, ROI, downscale pixel ratio, and/or BPP).

The sensor 740 can then obtain and send (e.g., output and transmit) a primary image frame 710a of a scene (e.g., which may include a person's face). The primary image frame 710a can be sent with a data type of zero (DT 0).

The sensor 740, during an idle time of the image sensor (e.g., the VBI, such as VBI time 530 of FIG. 5), can obtain and send (e.g., output and transmit) a plurality of auxiliary image frames 720 of the scene. The auxiliary image frames 720 can be sent with a data type of one (DT 1) during the idle time (e.g., VBI). In one or more examples, each of the auxiliary image frames 720 can correspond to a ROI (e.g., the face of the person) in the scene and can include a lower resolution than the primary image frame 710a.

In one or more examples, each of the auxiliary image frames 720 can include a lower BPP than the primary image frame 710a. In some examples, each of the auxiliary image frames 720 can include a downscaled pixel ratio as compared to the primary image frame 710a. In one or more examples, each of the auxiliary image frames 720 can include analog pixel binning with respect to the primary image frame 710a. In some examples, the ROI can be based on user input, object detection, a center of the primary image frame, an area of the scene associated with a gaze of a user (e.g., an area of the scene that one or more eyes of a user is focused on), and/or a predetermined distance (e.g., a range) from the image sensor.

The CSI decoder 750 can then separate out the incoming data (e.g., the primary image frame 710a and the auxiliary image frames 720) from the sensor 740 to be inputted into the AF engine 780 and the ISP 790. The DT filter 760b (e.g., a DT 0 filter) can filter out only the primary image frame 710a, which is meant for the preview and video, to be inputted into the ISP 790. Parallelly, the DT filter 760a (e.g., a DT 0 and DT 1 filter) can filter out both the primary image frame 710a and the auxiliary image frames 720.

The cropping engine 770 can crop the primary image frame 710a based on the ROI to produce a cropped primary image frame. The cropped primary image frame can also be downscaled to the appropriate downscale pixel ratio and with only the MSB bits of interest to produce a downscaled cropped primary image frame 710b. The downscaled cropped primary image frame 710b and the auxiliary image frames 720 can be sent to and inputted into the AF engine 780 for processing. Essentially, the downscaled cropped primary image frame 710b has the same attributes as the auxiliary image frames 720.

The AF engine 780 (e.g., an autofocus processor, which may be within the autofocus detect engine 785 within the AF engine 780) can process (e.g., perform CDAF) the downscaled cropped primary image frame 710b and the auxiliary image frames 720 to focus the sensor 740 (e.g., to move a lens closer to or further from the sensor 740 to capture an additional image frame, such as an additional primary image frame) based on the ROI. For instance, the autofocus processor (e.g., which may be within the autofocus detect engine 785) can transmit (e.g., feedback), to the sensor 740, the ROI and the resolution of the auxiliary image frames 720. The sensor 740 can adjust parameters of the sensor 740, based on the ROI and the resolution of the auxiliary image frames 720 received from the autofocus processor. In some aspects, the parameters can include a number of auxiliary images that will be output during an idle time (e.g., a VBI), resolution of the auxiliary images, BPP of the auxiliary images, a downscale ratio for downscaling the auxiliary images, etc.

In one or more examples, the number of auxiliary image frames 720 can be decided based on a required autofocus rate, a motor speed of the lens 730, and/or a system power budget. In some examples, the resolution of the auxiliary image frames 720 (e.g., the DS pixel ratio and/or BPP) can be configured based on a trade-off between autofocus speed (e.g., autofocus quality) and power consumption.

As an example, on average, PDAF can consume two to three primary image frames to achieve autofocus. Conversely, CDAF consumes sixteen to eighteen primary image frames to achieve autofocus. When applying the CDAF solution, five additional auxiliary image frames can be transmitted for CDAF. As such, this CDAF solution would be able to autofocus within three primary image frames, thereby meeting the high performance requirement of PDAF. In one or more examples, the solution utilizing auxiliary image frames for autofocusing can also be implemented for PDAF to improve the performance of autofocus from two to three primary image frames to just one primary image frame. While a particular number of image frames is provided as an illustrative example, the actual number of image frames may vary depending on various factors, such as ambient conditions. However, regardless of the exact number of frames used by PDAF versus CDAF, CDAF is significantly slower than PDAF in current solutions.

Figure 8:
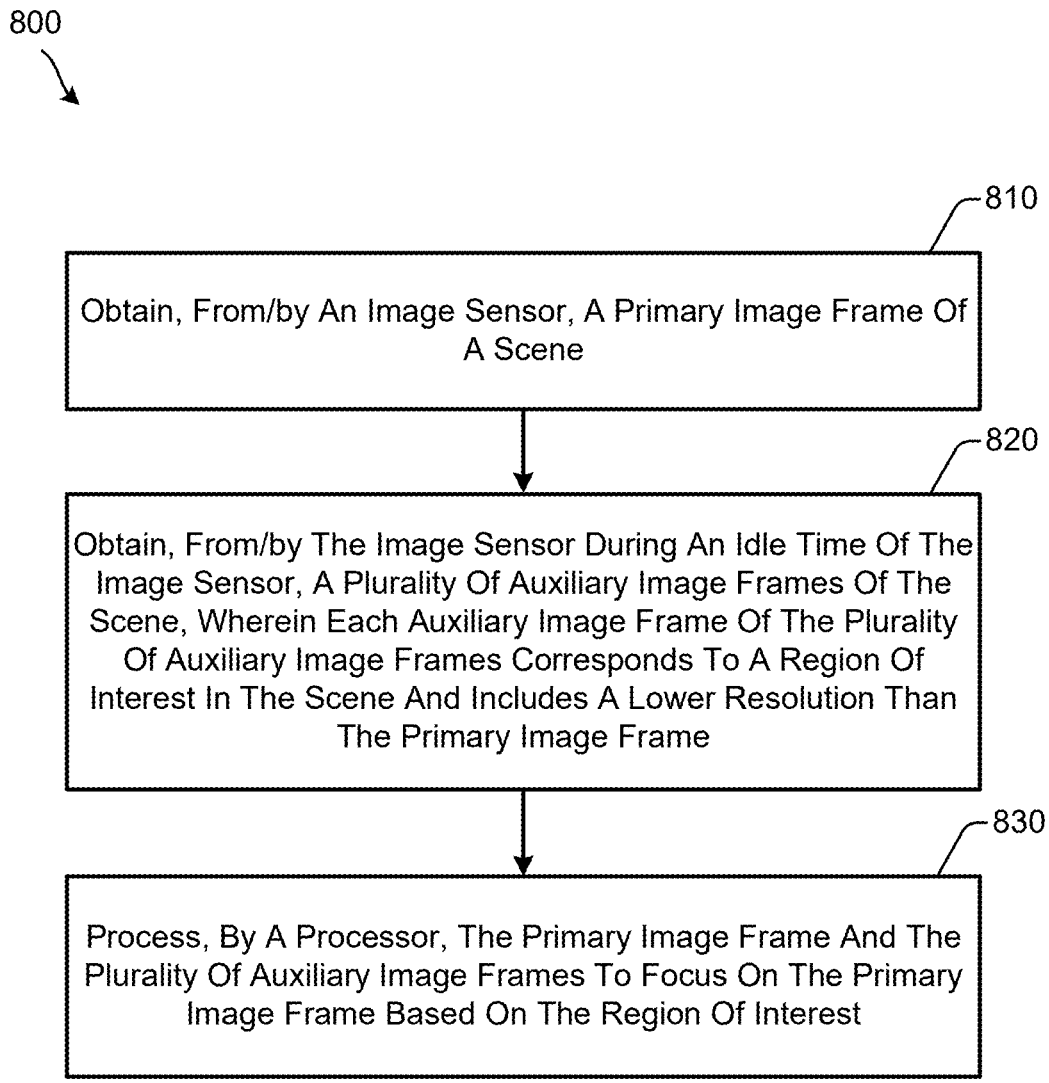
FIG. 8 is a flow diagram illustrating an example of a process for image processing, in accordance with some examples.

FIG. 8 is a flow chart illustrating an example of a process 800 for image processing. The process 800 can be performed by a computing device (e.g., image capture and processing system 100 of FIG. 1, image capture and processing system 200 of FIG. 2, device 300 of FIG. 3, the system 700 of FIG. 7, and/or a computing device or computing system 900 of FIG. 9) or by a component or system (e.g., a chipset, one or more processors such as one or more central processing units (CPUs), digital signal processors (DSPs), graphics processing units (GPUs), any combination thereof, and/or other type of processor(s), or other component or system) of the computing device. The operations of the process 800 may be implemented as software components that are executed and run on one or more processors (e.g., processor 910 of FIG. 9 or other processor(s)). Further, the transmission and reception of signals by the computing device in the process 800 may be enabled, for example, by one or more antennas and/or one or more transceivers (e.g., wireless transceiver(s)).

At block 810, the computing device (or component thereof) can obtain, by or from an image sensor, a primary image frame of a scene. For instance, at least one processor (e.g., an autofocus processor, such as an autofocus processor of the AF engine 780 of FIG. 7, which in some cases can include CDAF or a PDAF processor) of the computing device can obtain the primary image from the image sensor. The image sensor can be used to capture the primary image. In some cases, the computing device includes the image sensor. In other cases, the computing device is separate from the image sensor, in which case the computing device receives the primary image from the image sensor. In some cases, the image sensor is a fast readout sensor (e.g., as described with respect to FIG. 5).

At block 820, the computing device (or component thereof) can obtain, by or from the image sensor during an idle time (e.g., a vertical blanking interval (VBI)) of the image sensor, a plurality of auxiliary image frames of the scene. For instance, at least one processor (e.g., the autofocus processor) of the computing device can obtain the plurality of auxiliary image frames from the image sensor. The image sensor can be used to capture the auxiliary image frames. Each auxiliary image frame of the plurality of auxiliary image frames corresponds to a region of interest in the scene and includes a lower resolution than the primary image frame. In some aspects, the region of interest can be determined based on user input, object detection, a center of the primary image frame, an area of the scene associated with a gaze of a user, a predetermined distance from the image sensor, any combination thereof, and/or based on other factors. Additionally or alternatively, in some cases, each auxiliary image frame of the plurality of auxiliary image frames can include a lower number of bits per pixel than the primary image frame. Additionally or alternatively, in some aspects, each auxiliary image frame of the plurality of auxiliary image frames can include a downscaled pixel ratio as compared to the primary image frame. Additionally or alternatively, in some examples, each auxiliary image frame of the plurality of auxiliary image frames can include pixel binning (e.g., can be generated by performing pixel binning), such as analog pixel binning, with respect to the primary image frame.

In some aspects, the computing device (or component thereof) can crop the primary image frame according to the region of interest. For instance, as described with respect to FIG. 7, a cropping engine 770 can crop the primary image frame 710*a* based on the ROI to produce a cropped primary image frame.

At block 830, the computing device (or component thereof) can process the primary image frame and the plurality of auxiliary image frames to focus the primary image frame based on the region of interest. For instance, with reference to FIG. 1 as an illustrative example, the focus control mechanism 125B can move the lens 115 closer to the image sensor 130 or farther from the image sensor 130 by actuating a motor or servo to adjust focus of the primary image frame. In some cases, to process the primary image frame and the plurality of auxiliary image frames, the computing device (or component thereof) can perform at least one of contrast detection automatic focusing or phase detection automatic focusing.

In some aspects, the computing device (or component thereof) can transmit (or output for transmission), to the image sensor, the region of interest and a resolution of each auxiliary image frame of the plurality of auxiliary image frames. In some cases, the image sensor can adjust parameters of the image sensor based on the region of interest and the resolution of each auxiliary image frame of the plurality of auxiliary image frames received from the at least one processor. According to some examples, the parameters can include a number of auxiliary image frames that will be output during an idle time (e.g., a VBI), resolution of the auxiliary image frames, BPP of the auxiliary image frames, a downscale ratio for downscaling the auxiliary image frames, any combination thereof, and/or other parameters.

In some cases, the computing device of process 800 may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device of process 800 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 800 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
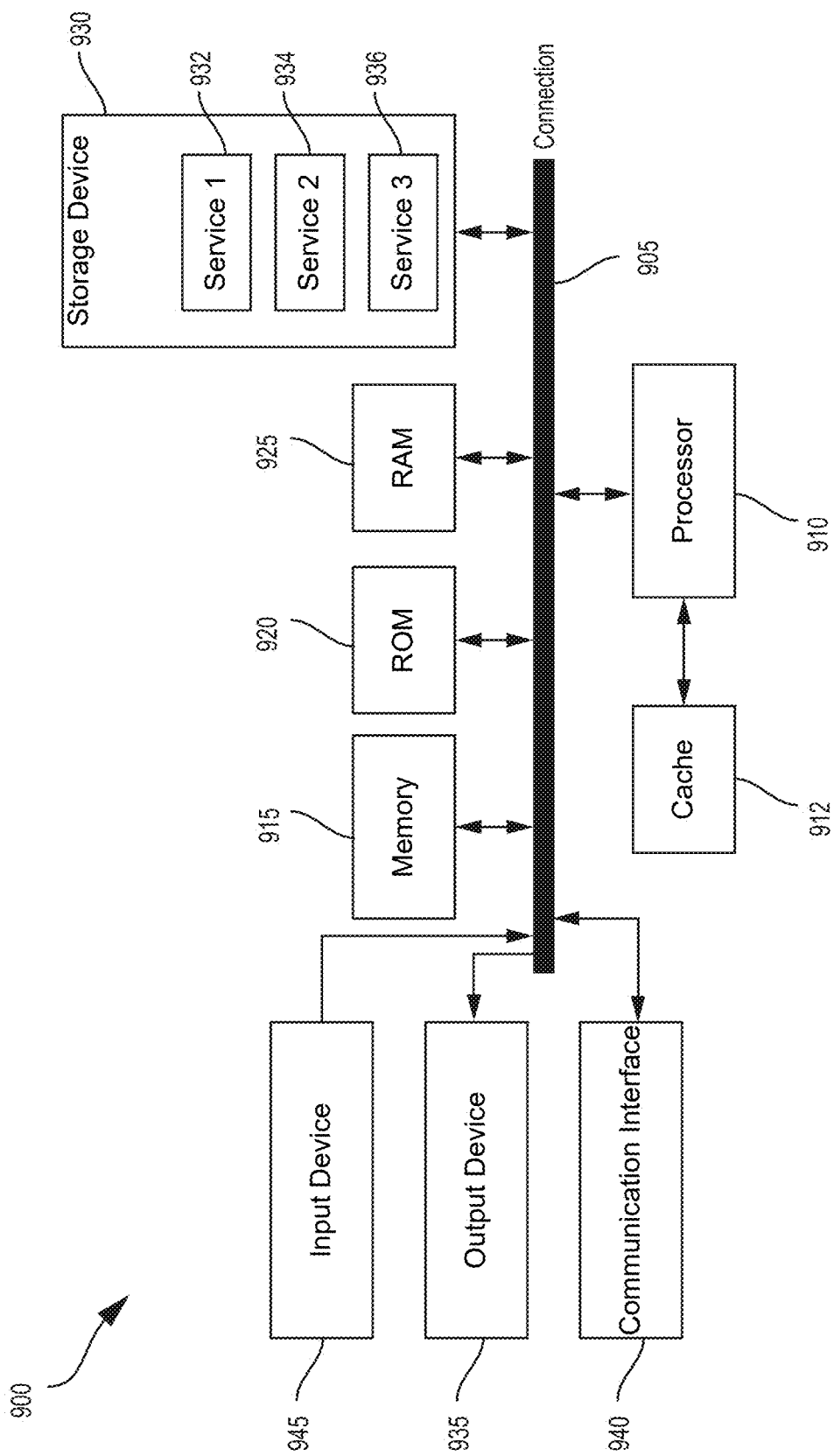
FIG. 9 is a diagram illustrating an example of a system for implementing certain aspects described herein.

FIG. 9 is a block diagram illustrating an example of a computing system 900, which may be employed for contrast-based high speed autofocus. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some aspects, computing system 900 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 900 includes at least one processing unit (CPU or processor) 910 and connection 905 that communicatively couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900.

Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 940 may also include one or more range sensors (e.g., LIDAR sensors, laser range finders, RF radars, ultrasonic sensors, and infrared (IR) sensors) configured to collect data and provide measurements to processor 910, whereby processor 910 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some aspects, a hardware service that performs a particular function can include the software component stored in a computer-readable medium in connection with the necessary hardware components, such as processor 910, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the embodiments disclosed herein may be implemented as electronic hardware, computer software, firmware, or combinations thereof. To clearly illustrate this interchangeability of hardware and software, various illustrative components, blocks, engines, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as engines, modules, or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for image processing, the apparatus comprising: at least one memory; and at least one processor coupled to the at least one memory and configured to: obtain, from an image sensor, a primary image frame of a scene; obtain, from the image sensor during an idle time of the image sensor, a plurality of auxiliary image frames of the scene, wherein each auxiliary image frame of the plurality of auxiliary image frames corresponds to a region of interest in the scene and comprises a lower resolution than the primary image frame; and process the primary image frame and the plurality of auxiliary image frames to focus the primary image frame based on the region of interest.

Aspect 2. The apparatus of Aspect 1, wherein each auxiliary image frame of the plurality of auxiliary image frames further comprises a lower number of bits per pixel than the primary image frame.

Aspect 3. The apparatus of any of Aspects 1 or 2, wherein each auxiliary image frame of the plurality of auxiliary image frames further comprises a downscaled pixel ratio as compared to the primary image frame.

Aspect 4. The apparatus of any of Aspects 1 to 3, wherein each auxiliary image frame of the plurality of auxiliary image frames further comprises analog pixel binning with respect to the primary image frame.

Aspect 5. The apparatus of any of Aspects 1 to 4, wherein the region of interest is based on at least one of user input, object detection, a center of the primary image frame, an area of the scene associated with a gaze of a user, or a predetermined distance from the image sensor.

Aspect 6. The apparatus of any of Aspects 1 to 5, further comprising cropping the primary image frame according to the region of interest.

Aspect 7. The apparatus of any of Aspects 1 to 6, wherein the at least one processor is configured to output, for transmission to the image sensor, the region of interest and a resolution of each auxiliary image frame of the plurality of auxiliary image frames.

Aspect 8. The apparatus of Aspect 7, further comprising the image sensor, wherein the image sensor is configured to adjust parameters of the image sensor based on the region of interest and the resolution of each auxiliary image frame of the plurality of auxiliary image frames received from the at least one processor.

Aspect 9. The apparatus of Aspect 8, wherein the image sensor is configured to capture the primary image frame and the plurality of auxiliary image frames of the scene.

Aspect 10. The apparatus of any of Aspects 1 to 9, wherein the idle time of the image sensor is a vertical blanking interval.

Aspect 11. The apparatus of any of Aspects 1 to 10, wherein the image sensor is a fast readout sensor.

Aspect 12. The apparatus of any of Aspects 1 to 11, wherein, to process the primary image frame and the plurality of auxiliary image frames, the at least one processor is configured perform at least one of contrast detection automatic focusing or phase detection automatic focusing.

Aspect 13. The apparatus of any of Aspects 1 to 12, wherein the at least one processor is an autofocus processor.

Aspect 14. The apparatus of Aspect 13, wherein the autofocus processor is one of a contrast detection autofocus processor or a phase detection autofocus processor.

Aspect 15. A method of image processing, the method comprising: obtaining, by an image sensor, a primary image frame of a scene; obtaining, by the image sensor during an idle time of the image sensor, a plurality of auxiliary image frames of the scene, wherein each auxiliary image frame of the plurality of auxiliary image frames corresponds to a region of interest in the scene and comprises a lower resolution than the primary image frame; and processing, by a processor, the primary image frame and the plurality of auxiliary image frames to focus the primary image frame based on the region of interest.

Aspect 16. The method of Aspect 15, wherein each auxiliary image frame of the plurality of auxiliary image frames further comprises a lower number of bits per pixel than the primary image frame.

Aspect 17. The method of any of Aspects 15 or 16, wherein each auxiliary image frame of the plurality of auxiliary image frames further comprises a downscaled pixel ratio as compared to the primary image frame.

Aspect 18. The method of any of Aspects 15 to 17, wherein each auxiliary image frame of the plurality of auxiliary image frames further comprises analog pixel binning with respect to the primary image frame.

Aspect 19. The method of any of Aspects 15 to 18, wherein the region of interest is based on at least one of user input, object detection, a center of the primary image frame, an area of the scene associated with a gaze of a user, or a predetermined distance from the image sensor.

Aspect 20. The method of any of Aspects 15 to 19, further comprising cropping the primary image frame according to the region of interest.

Aspect 21. The method of any of Aspects 15 to 20, further comprising transmitting, by the processor to the image sensor, the region of interest and a resolution of each auxiliary image frame of the plurality of auxiliary image frames.

Aspect 22. The method of Aspect 21, further comprising adjusting, by the image sensor, parameters of the image sensor based on the region of interest and the resolution of each auxiliary image frame of the plurality of auxiliary image frames received from the processor.

Aspect 23. The method of any of Aspects 15 to 22, wherein the idle time of the image sensor is a vertical blanking interval.

Aspect 24. The method of any of Aspects 15 to 23, wherein the image sensor is a fast readout sensor.

Aspect 25. The method of any of Aspects 15 to 24, wherein the processor is an autofocus processor, the autofocus processor including a contrast detection autofocus processor or a phase detection autofocus processor.

Aspect 26. The method of any of Aspects 15 to 25, wherein processing, by the processor, the primary image frame and the plurality of auxiliary image frames comprises one of contrast detection automatic focusing or phase detection automatic focusing.

Aspect 27. A non-transitory computer-readable medium having stored thereon instructions that, when executed by at least one processor, cause the at least one processor to perform operations according to any of Aspects 15 to 26.

Aspect 28. An apparatus for image processing, the apparatus including one or more means for performing operations according to any of Aspects 15 to 26.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. An apparatus for image processing, the apparatus comprising:
    at least one memory; and
    at least one processor coupled to the at least one memory and configured to:
        obtain, from an image sensor, a primary image frame of a scene;
        obtain, from the image sensor during an idle time of the image sensor, a plurality of auxiliary image frames of the scene, wherein each auxiliary image frame of the plurality of auxiliary image frames corresponds to a region of interest in the scene and comprises a lower resolution than the primary image frame; and
        process the primary image frame and the plurality of auxiliary image frames to focus the image sensor based on the region of interest.

2. The apparatus of claim 1, wherein each auxiliary image frame of the plurality of auxiliary image frames further comprises a lower number of bits per pixel than the primary image frame.

3. The apparatus of claim 1, wherein each auxiliary image frame of the plurality of auxiliary image frames further comprises a downscaled pixel ratio as compared to the primary image frame.

4. The apparatus of claim 1, wherein each auxiliary image frame of the plurality of auxiliary image frames further comprises analog pixel binning with respect to the primary image frame.

5. The apparatus of claim 1, wherein the region of interest is based on at least one of user input, object detection, a center of the primary image frame, an area of the scene associated with a gaze of a user, or a predetermined distance from the image sensor.

6. The apparatus of claim 1, further comprising cropping the primary image frame according to the region of interest.

7. The apparatus of claim 1, wherein the at least one processor is configured to output, for transmission to the image sensor, the region of interest and a resolution of each auxiliary image frame of the plurality of auxiliary image frames.

8. The apparatus of claim 7, further comprising the image sensor, wherein the image sensor is configured to adjust parameters of the image sensor based on the region of interest and the resolution of each auxiliary image frame of the plurality of auxiliary image frames received from the at least one processor.

9. The apparatus of claim 8, wherein the image sensor is configured to capture the primary image frame and the plurality of auxiliary image frames of the scene.

10. The apparatus of claim 1, wherein the idle time of the image sensor is a vertical blanking interval.

11. The apparatus of claim 1, wherein, to process the primary image frame and the plurality of auxiliary image frames, the at least one processor is configured perform at least one of contrast detection automatic focusing or phase detection automatic focusing.

12. The apparatus of claim 1, wherein the at least one processor is an autofocus processor.

13. A method of image processing, the method comprising:
    obtaining, by an image sensor, a primary image frame of a scene;
    obtaining, by the image sensor during an idle time of the image sensor, a plurality of auxiliary image frames of the scene, wherein each auxiliary image frame of the plurality of auxiliary image frames corresponds to a region of interest in the scene and comprises a lower resolution than the primary image frame; and
    processing, by a processor, the primary image frame and the plurality of auxiliary image frames to focus the image sensor based on the region of interest.

14. The method of claim 13, wherein each auxiliary image frame of the plurality of auxiliary image frames further comprises a lower number of bits per pixel than the primary image frame.

15. The method of claim 13, wherein each auxiliary image frame of the plurality of auxiliary image frames further comprises a downscaled pixel ratio as compared to the primary image frame.

16. The method of claim 13, wherein each auxiliary image frame of the plurality of auxiliary image frames further comprises analog pixel binning with respect to the primary image frame.

17. The method of claim 13, wherein the region of interest is based on at least one of user input, object detection, a center of the primary image frame, an area of the scene associated with a gaze of a user, or a predetermined distance from the image sensor.

18. The method of claim 13, further comprising cropping the primary image frame according to the region of interest.

19. The method of claim 13, further comprising transmitting, by the processor to the image sensor, the region of interest and a resolution of each auxiliary image frame of the plurality of auxiliary image frames.

20. The method of claim 19, further comprising adjusting, by the image sensor, parameters of the image sensor based on the region of interest and the resolution of each auxiliary image frame of the plurality of auxiliary image frames received from the processor.

* * * * *